July 13, 1954      J. C. BREWER      2,683,369

FLUID RATE OF FLOW INDICATOR

Filed Dec. 11, 1951      2 Sheets-Sheet 1

INVENTOR.
JAMES C. BREWER

Patented July 13, 1954

2,683,369

UNITED STATES PATENT OFFICE 2,683,369

FLUID RATE OF FLOW INDICATOR

James C. Brewer, Dayton, Ohio, assignor to the United States of America as represented by the Secretary of the Air Force Application December 11, 1951, Serial No. 261,129

6 Claims. (Cl. 73—228)

(Granted under Title 35, U. S. Code (1952), sec. 266)

The invention described herein may be manufactured and used by or for the United States Government for governmental purposes without payment to me of any royalty thereon.

The present invention relates to a fluid rate of flow indicator and particularly relates to such an indicator capable of indicating the mass flow rate.

The primary object of the invention is to provide a fluid rate of flow indicator including a housing having extending therethrough a fluid flow channel with a curved bucket in the channel adapted to directionally change the momentum of the flowing fluid and thus be subject to a force proportional to the rate of mass flow, whereby a visual indicator showing the relative value of this bucket-applied force will serve as an indication of the rate of mass flow of the fluid passing through the channel.

A further object of the invention is to provide a fluid rate of flow indicator including a housing having extending therethrough a fluid flow channel with a curved bucket in the channel adapted to directionally change the momentum of the flowing fluid and thus be subject to a force proportional to the rate of mass flow, including means associated with the mounting support for the curved bucket for measuring the relative value of the bucket-applied force and further including a movable vane extending into the channel, the position of said vane being under control of a density-sensing system to vary the cross sectional area of the channel in inverse relation to the fluid density so that the bucket-applied force will be equal for all equal rates of mass flow.

Another object of the invention is to provide a fluid rate of flow indicator including a fluid density sensitive means for regulating the cross sectional area of the fluid flow channel, so as to make the indicator responsive to varying fluid densities.

Another object of the invention is to provide a fluid rate of flow indicator capable of handling high flow rates and also offering exceptionally low resistance to fluid flow over all possible flow rates.

The above and other objects of the invention will become apparent upon reading the following detailed description in conjunction with the accompanying drawings, in which:

Fig. 1 is a vertical cross sectional view taken through the rate of flow indicator assembly along the line 1—1 of Fig. 2.

Fig. 2 is a horizontal cross sectional view taken through the rate of flow indicator assembly along the line 2—2 of Fig. 1.

Mechanical system

Figure 3:
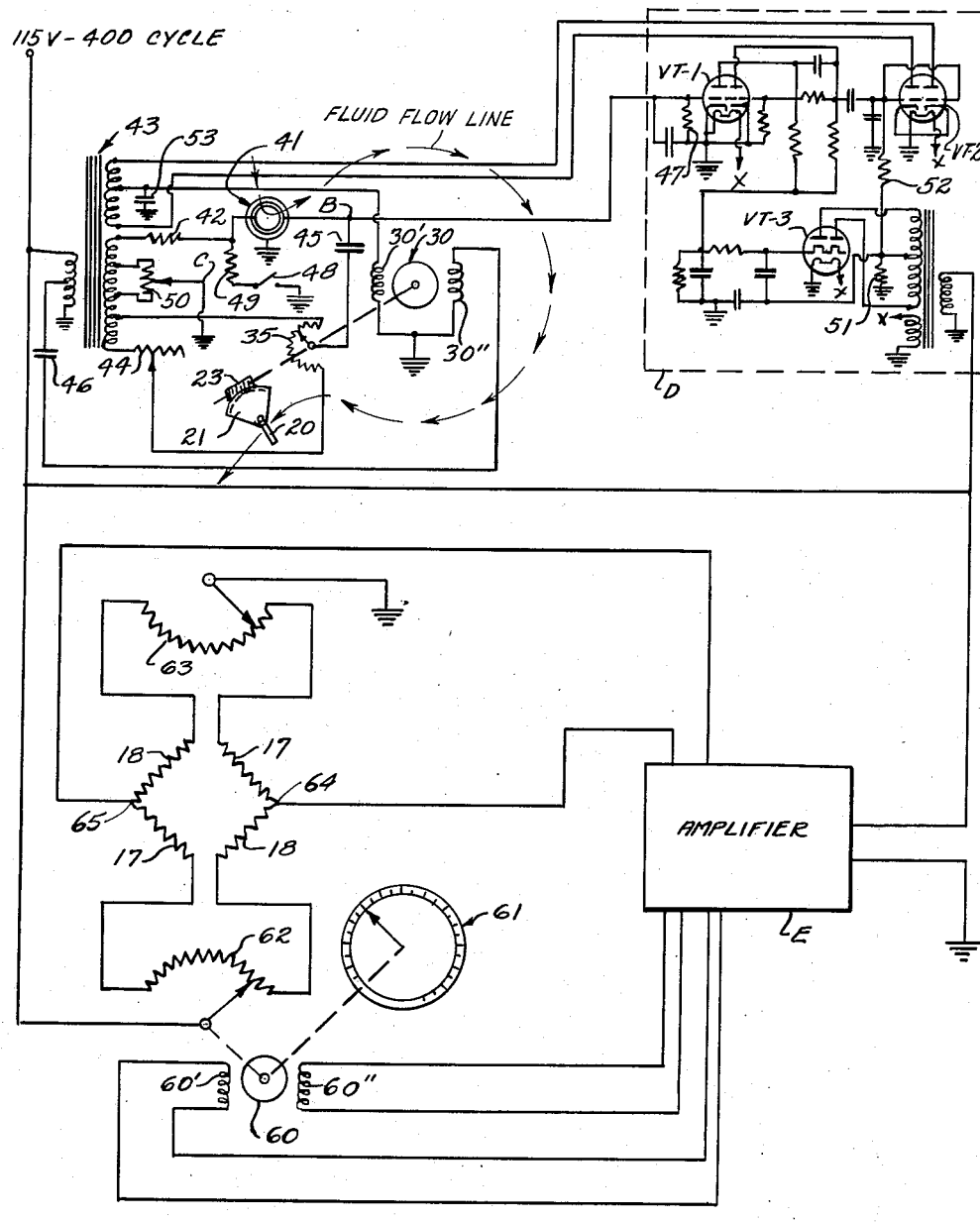
Fig. 3 is a wiring diagram of the complete rate of flow indicator including a density sensing system.

The principal mechanical component of the present fluid rate of flow indicator is shown in Figs. 1 and 2. A main housing portion 1 forms a support for the various elements and together with a cover 2 completely encloses these elements. Cover securing bolts 3 thread into apertured lugs 4 on the main housing portion 1. Apertured lugs 5 on the housing portion 1 are used in mounting the indicator assembly onto a supporting structure. A cover sealing gasket 6 is compressed between the confronting edges of the housing portion 1 and cover 2. A standard electrical connector 7 on the cover serves as a multi-lead terminal block for various electrical devices inside the housing, such as strain gages, electric motor and potentiometer. A gasket between the connector and cover prevents the escape of fluid.

The upper side of the main housing body 1 is closed by a wall 8 including a thin section over the gear box at the left and a thicker section covering the fluid channel 9 at the right. The latter extends at the opposite ends through coupling members 10' and 11' and the direction of fluid flow therethrough is indicated by spaced pairs of arrows (Fig. 2). The channel or passage 9 makes an abrupt turn, as at 10, midway of the length of the channel and one wall of the channel at the turn is formed by a curved vane or blade 11 including a mounting strut section 12 extending upwardly through but not touching wall 8. A lateral offset or recess 13 is provided in back of the blade 11 and at the downstream edge of the blade a streamlined island 14 is provided in relatively fixed position to minimize downstream turbulence around the blade. As will be observed the location of the blade at the turn of the channel will cause the flowing stream to impinge on the blade and stress the strut section 12 in proportion to the mass flow rate through the channel 9. The strut section 12 is secured in place by means of a bracket member 15 mounted on the wall 8 in rigid manner and carrying screws 16 passing through the upper end of the strut and thence into the bracket. A supplemental wall member 8' below the channel 9 provides a convenient means to mount the lower bearing for a movable vane to be described below. The force on the blade 11 develops a bending stress in the strut 12 and this stress must be measured in some accurate manner. For example there may be pairs of strain gages 17 and 18 on the strut 12 which are placed under tension and compression respectively as the force of flowing fluid tends to bend the strut in the direction of arrow A. Electrical leads 19 extend from the strain gages over to the connector 7.

Extending into the fluid flow channel 9 upstream from the turn 10 is a flow regulating gate or vane 20 including upper and lower pivots 20' for pivotally mounting the vane as shown and having a gear sector 21 rigidly connected thereto. The vane and sector are biased in a clockwise direction by means of a tension spring 22 as shown. Meshing with the gear sector in driving relation is a worm 23 carried on a shaft 24 journalled at 25 and 26. The shaft carries a worm wheel 27 meshing in driven relation with a worm 28 carried on a motor driven shaft 29. The motor 30 is mounted atop the wall 8 and includes connecting leads 31 extending to the connector 7. The worm shaft 24 has a potentiometer rotor 32 rigidly carried thereon and the rotor has exterior threads 33 of coarse pitch adapted to interfit with a sliding stator 34 and thus cause longitudinal reciprocation of the stator. The stator is wound internally as at 35 with resistance wire and a spring arm contactor 36 on the rotor 32 always contacts a single point on the wire. A spring arm 37 provides a connection to the wiper or contactor 36 by way of a stud 38 on the rotor. Opposite guides 39 and 40 serve to slidably mount the stator 34 and permit its back and forth movement under action of the threaded rotor 32. Of course it will be understood that the potentiometer rotor 32 and stator 34 are both made of some suitable insulating material. Flexible leads (not shown) are connected to opposite ends of the resistance windings 35. The motor 30 is a two-phase reversible machine including a reference field and rebalance field.

*Electrical system*

Considering now the wiring diagram of Fig. 3 it will be noted that the portion thereof at the upper side of the sheet is a control circuit for determining the relative position of the pivoted vane 20 described above. Changes in position of the vane are effected by changes in fluid density. Several kinds of density sensing devices can be used to energize the control circuit but for fluids having good dielectric properties, such as liquid hydrocarbons, the changes in fluid density may be reflected in proportional changes in the dielectric properties of the fluid. Thus if a liquid immersed condenser is coupled into the control circuit, the capacity will increase as the density of the liquid hydrocarbon increases. Of course the liquid hydrocarbon should be relatively free of water and inorganic salts. It should also be free of metallic particles and any other electrically conductive adulterants, such as graphite.

The fluid immersed condenser 41 may take the form of coaxial tubular members, such as is shown in more detail in an article entitled "Airplane Fuel Gage" appearing on pages 77-79 of Electronics for April 1950. In the present apparatus the liquid level is maintained constant in the condenser and the condenser and its container is arranged to receive a portion at least of all the liquid fuel flowing through the mechanical component shown in Figs. 1 and 2. Thus the condenser housed in a small cylinder is constantly immersed in liquid and is constantly sampling the density of the flowing liquid by means of the capacitive effect thereof on the control circuit. As long as the container housing the condenser is maintained full at all times the relative position thereof is in no way critical. The condenser 41 comprises three coaxial cylinders the outermost of which is grounded. This outer cylinder may serve both as a container for the inner cylinders and for the liquid hydrocarbon and also as an electrostatic shield for the spaced cylinders within the outer cylinder. The innermost cylinder is connected by way of a 500 ohm resistor 42 to the lower secondary winding of the power transformer 43. The other end of the lower secondary winding is connected through a calibrating resistor 44 (1000 ohms) to the balance potentiometer 35, the total resistance of which may be in the neighborhood of 1400 ohms. The winding of the potentiometer is also connected to the lower secondary winding at a 37-volt tap. The wiper arm of the potentiometer is connected through the condenser 45 (910 micromicrofarads) to the intermediate cylinder of the condenser unit 41.

The potentiometer winding 35, the same as that shown in Fig. 2, is contacted by a wiper adapted to be driven in either direction of rotation by means of the two-phase motor 30. One winding 30' of the motor, which may be termed the rebalance field, is connected to the upper secondary winding of the transformer 43, and more specifically to a center tap of the winding. The other or reference field winding 30'' is connected through the condenser 46 (0.07 microfarad) to a 100 volt tap on the primary winding of transformer 43. Corresponding ends of the motor windings 30' and 30'' are connected together and grounded. Besides driving the potentiometer, the motor 30 is also connected in driving relation to gear sector 21 and flow regulating vane 20.

The circuit thus far described is a capacity bridge comprising an upper branch which includes condenser unit 41 and a lower branch which includes condenser 45. Also included in upper and lower branches of the bridge are upper and lower portions of the lower secondary winding of transformer 43. The output leads for the bridge circuit are indicated at B and C in Fig. 3 and these leads provide the input connections for the phase-discriminating amplifier D. The lead C reaches the amplifier by way of a ground connection. The bridge circuit diagonal connected between points B and C includes resistor 47 and the ground connections. Since the capacity of the condenser unit 41 varies with the density of the flowing liquid, the current in the upper branch of the bridge circuit will increase or decrease with with an increase or decrease in the condenser capacity. However by the use of the motor-driven potentiometer 35, the current flowing in the lower branch of the bridge circuit may be varied to provide a self-balancing bridge circuit. Thus the rebalancing potentiometer 35 by its effect on the bridge circuit causes the motor 30 to move the flow regulating vane 20 to a position where the cross sectional area of the flow channel will be inversely proportional to the density of the flowing liquid.

The circuit of Fig. 3 includes a testing switch 48 in series with a resistor 49 of about 400 ohms. Upon closing the switch the circuit completed to ground will completely unbalance the bridge circuit and the response of the motor 30 will show that the electrical and mechanical systems involved in the flow indicator are functioning in a normal manner. The indicator to be described below will be deflected suddenly on closing of the testing switch 48 if the complete system is functioning normally. The calibration resistors 44 and 50 are merely for the purpose of adjusting the bridge circuit when the indicator is installed. When the bridge circuit is in balance the current in the upper branch will be equal to the current in the lower branch. Because these branches connect to opposite ends of the center-tapped lower secondary winding of transformer 43, the currents therein will always be 180° out of phase with respect to each other. Thus in a balanced condition of the bridge circuit, the equal and oppositely-phased currents will cancel each other in the bridge diagonal which includes resistor 47 (1 megohm) and no potential will appear across the bridge output leads B and C. Assuming now that the bridge is unbalanced by increasing the capacity of condenser unit 41, a current will flow in the branch of the bridge circuit including the condenser which will be greater than that in the lower branch of the bridge including condenser 45 and rebalancing potentiometer 35. Therefore this larger current will cancel out the smaller current and the resultant will provide an input for the amplifier D.

The input of the phase-discriminating amplifier D is connected across the bridge output points B and C, one connection being by way of ground. When the bridge is out of balance a small potential will be impressed on the resistor 47 of the amplifier D. The tube VT-1 of the amplifier may be of type No. 7F7, the tube VT-2 may be of type No. 7N7 and the rectifier tube VT-3 may be of type No. 7Y4. The amplified signal from the tube VT-1 is passed to the connected grids of the double triode VT-2. These grids are normally biased to cut-off by reason of the voltage developed across the resistor 51 (10,000 ohms) by rectifier tube VT-3 and applied to the grids through resistor 52 (1 megohm). Therefore if the bridge circuit is in balance and the amplifier input is zero no current will flow from anode to cathode in the tube VT-2. However with the bridge circuit out of balance the current in either the upper or lower branch will predominate and a potential will be impressed on the amplifier tube VT-1. The resultant output of tube VT-1 is impressed on the grid circuit of the phase-discriminating tube VT-2. The plates of the latter tube being connected to opposite ends of the center tapped upper secondary winding of transformer 43, the potential on one of the plates will be 180° out of phase with respect to the potential on the other plate. However one or the other of these potentials will be in phase with the amplified bridge output, depending on which branch of the bridge circuit carries the predominating current. That section of the tube VT-2 which has its anode potential in phase with the grid potential acts as a half-wave rectifier for the 400 cycle potential on its anode. The result is a pulsing direct current which flows through motor winding 30′ back to the center tap of the upper secondary winding of the transformer 43. The motor winding 30′ is tuned by a condenser 53 (0.07 microfarad) to the fundamental frequency of the pulsing direct current, which is 400 cycles. In this way a 400 cycle alternating current is developed in winding 30′. This current is either in phase or 180° out of phase with respect to the current in the primary winding of transformer 43, depending on which section of tube VT-2 is operative. The current in motor winding 30″ is 90° out of phase with respect to the current in the primary winding of transformer 43 due to the action of condenser 46. It is therefore seen that the current in winding 30′ either leads or lags the current in winding 30″ by 90° depending on which section of tube VT-2 is operative, and this in turn depends on the phase of the signal applied to the input of amplifier VT-1. Thus the conditions for rotation in a two-phase induction motor are satisfied, because of the 90° phase difference. With the current in the rebalance field 30′ leading the current in the reference field 30″ the rotation will be in one direction, and when the current in field 30′ lags the current in field 30″ the rotation will be in the opposite direction.

In the density sensing circuit as described above the phase relations are so adjusted that if the current in the upper branch of the bridge circuit exceeds the current in the lower branch, the motor 30 rotates the rebalancing potentiometer 35 in a direction to introduce more voltage into the branch of the bridge including the potentiometer, thus increasing the current therein until the bridge is balanced and no further current is applied to amplifier tube VT-1. If the current in the upper branch of the bridge circuit, including condenser 41, is less than the current in the lower branch, including condenser 45, then the phase of the potential applied to tube VT-1 will be opposite to that applied in the preceding situation. Therefore, the other section of tube VT-2 will be operative, and as a result the phase of the current in the rebalance field 30′ will be reversed. This will cause the motor 30 and the potentiometer 35 to rotate in the opposite direction, thus reducing the current in the lower branch of the bridge circuit until a balanced condition is again attained and the voltage applied to the tube VT-1 is reduced to zero. Then both sections of the tube VT-2 become inoperative and the motor 30 stops because the rebalance field 30′ is no longer receiving its excitation from the phase-discriminating amplifier D.

Direct indication of the rate of mass flow of fluid is obtained by means of a second bridge circuit including strain gages 17 and 18 and an indicator motor 60 driving an indicator 61 and a potentiometer 62. The bridge circuit includes the strain gages, rebalance potentiometer 62 and also a standardizing and zeroing potentiometer 63. The output of the strain gage bridge circuit at terminals 64 and 65 is fed into an amplifier E similar to the phase-discriminating amplifier D described above. The output of the amplifier E is connected to the rebalance field winding 60′ and to the reference field winding 60″ of the two-phase reversible motor 60. The latter drives both a balancing potentiometer 62 and the mass flow indicating means 61 through suitable reduction gearing (not shown). The mechanical gearing is indicated by the broken lines extending from the axis of the motor armature. The two tension stress strain gages 17 are connected in two opposite legs of the resistance bridge circuit, while the two compression stress strain gages 18 are connected in the other two opposite legs of the bridge circuit. This particular arrangement gives a bridge circuit having a maximum degree of sensitivity in relation to changes in bending stress in the vane supporting strut 12. The potential input to the bridge circuit is applied to the wiper arms of the potentiometers 62 and 63, it being understood that one side of the 115 volt, 400 cycle potential source is grounded. When the bridge circuit is in balance, that is when the potential output to the amplifier E is zero, the amplifier output to the rebalance field winding 60' will be zero and the indicator 61 and potentiometer 62 will be in a stable condition. When the bridge circuit is out of balance following a change in the rate of mass flow through the channel 9 (Fig. 2), the resulting input to the amplifier E will affect the phase discriminating circuit just as the output of the density sensing bridge circuit affects the phase discriminating amplifier D. Therefore, a signal output from the amplifier E will be impressed on the rebalance field winding 60' and the circuit flowing will either lead or lag the current flowing in the reference field winding 60'', depending upon which section of the double triode in the amplifier is operative. This in turn depends on the phase of the signal applied to the amplifier from the bridge circuit having two branches, either of which may carry the predominating current. The circuit action is exactly the same as that described in connection with the density sensing and amplifying circuit and the result of any bridge unbalance is that the two-phase motor 60 will rotate in one direction or the other to reach a stable condition in which the indicator 61 will show the rate of mass flow in pounds per hour or any other suitable units of mass flow rate.

The indicator disclosed herein measures as a function of the rate of fluid flow the force felt by a relatively fixed bucket or vane as the vane changes the directional momentum of a stream of fluid impinging thereon and being deflected therefrom. In such an instrument the mass of fluid flowing past a given point in the flow channel may be expressed as follows:

(1) $$M = DVA$$

where $M$ is rate of mass flow
$D$ is density
$V$ is velocity
$A$ is cross sectional area Also the force felt by the vane in changing the directional momentum may be expressed as follows:

(2) $$dF = MdV$$

where $dF$ is increment of force
$dV$ is increment of velocity

Therefore, it will be seen that if the force on the vane can be measured and if the cross sectional area of the fluid stream is known, the change in momentum of the fluid will be reflected in a definite force on the vane for any given rate of mass flow. That is the force on the vane will be a function of the rate of mass flow.

Integration of Equation 2 gives the following:

(3) $F = kMV$ provided $F_0 = 0$ when $V = 0$ where $F$ is the force on the vane 11 and $k$ is a constant depending on the vane characteristics and the angle of deflection of the fluid therefrom.

Equation 3 may be expressed in a different form by substituting for the rate of mass flow $M$, the density of the fluid $D$ multiplied by the cross sectional area $A$ and by the velocity of fluid flow at the area $A$. The result is as follows:

(4) $$F = kDV^2 A$$

This shows that for any one area of cross section and constant velocity, a change in density will produce a different force on the vane 11. Such a change in force will be indicated on the dial 61, as the strain gage bridge circuit acts through amplifier E on the two-phase indicator motor 60.

Equation 3 may have subscripts applied thereto in order to compare changing conditions and their effect on the present indicator. The result will be:

(5) $$F_2 = F_1 \frac{M_2 V_2}{M_1 V_1}$$

Also if $M_2 = M_1$ then $$F_2 = F_1 \frac{V_2}{V_1}$$

Therefore, for equal rates of mass flow $F_2 = F_1$ only when $V_2 = V_1$.

In order to investigate the effect on the movable vane or gate 20 of changes in density for equal rates of mass flow ($M_2 = M_1$), Equation 1 may be assigned subscripts as follows:

(6) $$\frac{D_2}{D_1} = \frac{V_1 A_1}{V_2 A_2}$$

But if $V_2 = V_1$ for equal rates of mass flow then:

(7) $$\frac{D_2}{D_1} = \frac{A_1}{A_2}$$

Therefore, the cross sectional area must vary inversely with changes in density or the gate 20 and motor control therefor must be arranged to reduce the cross section of the fluid stream as fluid density increases. Such reduction in cross section will increase the flow velocity and thus build up the force on the vane 11. The density sensing circuit and the two phase motor 30 are so connected as to make the fluid stream area at the gate 20 vary inversely with the fluid density. Since the indicator is a rate of mass flow indicator, the dial 61 should be calibrated to read in pounds per hour or some suitable units of mass flow rate.

As will be readily appreciated the present indicator has a closed fluid flow channel unimpeded by an impeller or other fluid current motor. Thus, the device will not impose a high load on the fluid pump and furthermore there are no rapidly moving parts to cause bearing failure. Another advantage is that the temperature of the flowing fluid does not need to be known because the density sensing circuit senses density change due to any factor, including temperature. It is further noted that in the fluid flow rate transmitter or component of Figs. 1 and 2, the space behind the pressure sensing vane 11 should be always filled with fluid but the fluid flow rate or velocity in the space should be kept at a low rate. Thus, the gap between the vane 11 and the housing wall at the upstream end of the vane should be relatively small.

The embodiment of the invention herein shown and described is to be regarded as illustrative only and it is to be understood that the invention is susceptible of variations, modifications and changes within the scope of the appended claims.

I claim:

1. A fluid rate of flow indicator comprising, means providing a closed channel through which a fluid may flow in one direction, means providing an abrupt turn in said channel between the opposite ends thereof, a curved vane in said channel extending around the outside of said abrupt turn, means on said vane to produce a first electrical signal proportional to the force on said curved vane due to the flowing fluid impinging thereon as its direction is changed by said abrupt turn, means responsive to said first electrical signal to indicate the relative magnitude of the force on said curved vane and thus indicate the rate of mass flow of said fluid, a movably mounted gate in said channel upstream from said abrupt turn to vary the area of cross section of said channel at said gate, electrical means including a container through which said fluid passes before reaching said channel to produce a second electrical signal proportional to the fluid density, and an electrically actuated motor means responsive to said second electrical signal and connected in driving relation to said gate to cause the area of cross section of said channel at said gate to vary in inverse relation with respect to the fluid density.

2. A fluid rate of flow indicator comprising, means providing a closed channel through which a fluid may flow in one direction, means providing an abrupt turn in said channel between the opposite ends thereof, a curved vane in said channel extending around the outside of said abrupt turn, means including an elongated strut section mounting said curved vane in said channel, means including strain gages on said strut section to produce a first electrical signal proportional to the force on said curved vane due to the flowing fluid impinging thereon as its direction is changed by said abrupt turn, means including a first reversible electrical motor and a dial indicator responsive to said first electrical signal to indicate the relative magnitude of the force on said curved vane and thus indicate the rate of mass flow of said fluid, a movably mounted gate in said channel upstream from said abrupt turn to vary the area of cross section of said channel at said gate, means to produce a second electrical signal proportional to the density of the flowing fluid, a second reversible electrical motor responsive to said second electrical signal and connected in driving relation to said gate to cause the area of cross section of said channel at said gate to vary in inverse relation with respect to the fluid density.

3. A fluid rate of flow indicator comprising, means providing a closed channel through which a fluid may flow in one direction, means providing an abrupt turn in said channel between the opposite ends thereof, a curved vane in said channel extending around the outside of said abrupt turn, means including an elongated strut section mounting said curved vane in said channel, means including strain gages on said strut section and a bridge circuit to produce an electrical signal proportional to the force on said curved vane due to the flowing fluid impinging thereon as its direction is changed by said abrupt turn, means including a reversible electrical motor and a dial indicator responsive to said electrical signal to indicate the relative magnitude of the force on said curved vane and thus indicate the rate of mass flow of said fluid, and electrical means including a movable gate upstream from said abrupt turn to vary the cross sectional area of said channel at said gate in inverse relation with respect to the fluid density.

4. A fluid rate of flow indicator comprising, fluid flow conducting means providing a closed channel through which a fluid may flow in one direction, means providing an abrupt turn in said channel between the opposite ends thereof, a curved vane movably mounted in said channel extending around the outside of said abrupt turn, rate of flow determining means on the vane responsive to movement thereof incident to the relative magnitude of the force on the curved vane due to the flowing fluid impinging thereon as its direction is changed by said abrupt turn and means connected to the last named means to indicate the rate of mass flow of said fluid through said channel, and flow regulating means in said channel including a movable gate and connected fluid density operated control means therefor mounted upstream from said abrupt turn to adjust said gate to vary the cross sectional area of said channel at said gate in inverse relation with respect to the density of the fluid passing said density operated control means.

5. A fluid rate of flow indicator comprising, fluid flow conducting means providing a closed channel through which a fluid may flow in one direction, means providing an abrupt turn in said channel between the opposite ends thereof, a curved vane flexibly mounted in said channel extending around the outside of said abrupt turn, means fixed to the vane responsive to flexure thereof incident to the relative magnitude of the force on the curved vane due to the flowing fluid impinging thereon as its direction is changed by said abrupt turn and means connected to the last named means to indicate the rate of mass flow of said fluid through said channel, flow regulating means including a pivotally mounted gate in said channel upstream from said abrupt turn to vary the area of cross section of said channel at said gate, density operated control means in said channel including an electrical motor connected thereto, responsive to the change in density of the fluid passing said density operated control means to actuate said gate to adjust the area of cross section of said channel at said gate in inverse relation to the fluid density.

6. A fluid rate of flow indicator comprising, fluid flow conducting means providing a closed channel through which a fluid may flow in one direction, one side of said channel being provided with a lateral flow deflecting protuberance including an adjustable flow regulating gate for deflecting the path of said fluid toward the opposite side of the channel and regulating the fluid flow through the channel, a curved vane yieldably mounted in the channel opposite said protuberance and downstream of said gate for receiving the force of impact of said deflected fluid, a force measuring device mounted on said vane responsive to the flexing thereof for determining the rate of mass flow of said fluid in said channel, said flow regulating gate being movably mounted upstream adjacent said protuberance, fluid density responsive electrical signal means in said fluid, electrically operable gate adjusting means connected thereto and connected to said gate responsive to the density changes of the fluid for adjusting the position of said gate so as to vary the cross-sectional area of the channel inversely to the changes in fluid density.

References Cited in the file of this patent

UNITED STATES PATENTS

| Number | Name | Date |
|---|---|---|
| 1,401,299 | Wohlenberg | Dec. 27, 1921 |

FOREIGN PATENTS

| Number | Country | Date |
|---|---|---|
| 237,827 | Great Britain | Aug. 6, 1925 |